United States Patent
Chien (10) Patent No.: US 10,978,946 B1
(45) Date of Patent: Apr. 13, 2021

(54) CHARGE PUMP CIRCUIT AND POWER SUPPLYING METHOD HAVING DYNAMIC VOLTAGE ADJUSTING MECHANISM OF THE SAME

(71) Applicant: REALTEK SEMICONDUCTOR CORPORATION, Hsinchu (TW)

(72) Inventor: Chih-Kang Chien, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/887,119

(22) Filed: May 29, 2020

(30) Foreign Application Priority Data

Oct. 14, 2019 (TW) .................................. 108136928

(51) Int. Cl.
*G05F 1/10* (2006.01)
*H02M 3/07* (2006.01)

(52) U.S. Cl.
CPC .................................. *H02M 3/073* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,282,985 B2 | 10/2007 | Yen et al. | | |
| 7,990,742 B2* | 8/2011 | Lesso | ...................... | H02M 3/07 363/62 |
| 8,710,911 B2* | 4/2014 | Chien | ...................... | H02M 3/07 327/536 |
| 10,148,171 B2* | 12/2018 | Nguyen | ...................... | H02M 3/07 |
| 2013/0181521 A1* | 7/2013 | Khlat | ...................... | H02M 3/07 307/31 |

FOREIGN PATENT DOCUMENTS

| TW | 200638660 | 11/2006 |
| TW | 201328155 A1 | 7/2013 |

OTHER PUBLICATIONS

OA letter of the counterpart TW application (appl. No. 108136928) mailed on Feb. 11, 2020. Summary of the TW OA letter: (1) Fig. 1 does not match the content in Paragraph [0012] and should be amended. (2) Claim 10 depends on wrong claim and should be amended. (3) Claims 1~10 are rejected as being unpatentable over the disclosure of the cited reference 1 (TW201328155A1, also published as US2013162337A1) and the cited reference 2 (TW200638660A, also published as US20060244513A1.

* cited by examiner

*Primary Examiner* — An T Luu
(74) *Attorney, Agent, or Firm* — WPAT, PC (57) ABSTRACT

The present disclosure provides a charge pump circuit. The power receiving terminal receives a power voltage. The first energy storage capacitor is coupled between the positive output terminal and the ground terminal. The second energy storage capacitor is coupled between the negative output terminal and the ground terminal. The charge pump circuit controls the first and the second flying capacitors to have a first and a second connection relation with the power-receiving, the ground and the positive and the negative output terminals respectively within a first and a second operation time in a double voltage power supplying mode. The charge pump circuit is operated in the first and the second operation time in an interlaced manner, such that the positive and the negative output terminals respectively output a positive and a negative output voltages each having a voltage value that is a double of that of the power voltage.

16 Claims, 5 Drawing Sheets

CHARGE PUMP CIRCUIT AND POWER SUPPLYING METHOD HAVING DYNAMIC VOLTAGE ADJUSTING MECHANISM OF THE SAME

BACKGROUND OF THE INVENTION

1. Field of the Invention

The present disclosure relates to a charge pump circuit and a power supplying method having dynamic voltage adjusting mechanism of the same.

2. Description of Related Art

Charge pump circuits are widely used in the driving circuit of electronic products. The charge pump circuits use capacitors to perform voltage conversion to further generate the required output supply voltages. Headphones are devices that often utilize charge pump circuits to drive the circuits.

In recent years, the demand of Hi-Fi audio increases, and the formats of the headphones become diverse. When a full scale output voltage (FSOV) of some headphone amplifier output formats is used to drive a low impedance headphone, the volume is acceptable. However, when the FSOV of these formats is used to drive a high impedance headphone, the volume is not enough. If a higher FSOV is used in order to fulfill the requirement of the volume of high impedance headphones, the power can not be saved at the same time. The main reason is that the FSOV is restricted by the power voltage of the charge pump. A lower power voltage is able to save power but is not able to support sufficient volume for high impedance headphones. On the contrary, a higher power voltage is able to support sufficient volume for high impedance headphones but is not able to save power.

As a result, if a power supply that can use a lower power voltage to generate positive and negative output voltages each having an absolute value higher than the power voltage, the performance of power dissipation and the efficiency of the charge pump circuits can be greatly improved.

SUMMARY OF THE INVENTION

In consideration of the problem of the prior art, an object of the present disclosure is to provide a charge pump circuit and a power supplying method having dynamic voltage adjusting mechanism of the same.

The present disclosure provides a charge pump circuit that includes a power-receiving terminal, a ground terminal, a positive output terminal, a negative output terminal, a first energy storage capacitor, a second energy storage capacitor, a first flying capacitor, a second flying capacitor and a pump unit circuit. The power-receiving terminal is configured to receive a power voltage. The positive output terminal is configured to output a positive output voltage. The negative output terminal is configured to output a negative output voltage. The first energy storage capacitor is electrically coupled between the positive output terminal and the ground terminal. The second energy storage capacitor is electrically coupled between the negative output terminal the ground terminal. The pump unit circuit is configured to, under a double power voltage power supplying mode, control the first flying capacitor and the second flying capacitor to form a first connection relation with the power-receiving terminal, the ground terminal, the positive output terminal and the negative output terminal within a first operation time period, and form a second connection relation within a second operation time period. Under the double power voltage power supplying mode, the pump unit circuit operates in the first operation time period and the second operation time period in an interlaced manner, such that the positive output terminal and the negative output terminal respectively output the positive output voltage and the negative output voltage, each having a voltage value that is a double of that of the power voltage.

The present disclosure also provides a power supplying method having a dynamic voltage adjusting mechanism used in a charge pump circuit. The power supplying method includes the steps outlined below. A power voltage is received by a power-receiving terminal, such that a positive output terminal outputs a positive output voltage and a negative output terminal outputs a negative output voltage. A first energy storage capacitor is electrically coupled between the positive output terminal and a ground terminal and a second energy storage capacitor is electrically coupled between the negative output terminal the ground terminal. Under a double power voltage power supplying mode, a pump unit circuit is used to control a first flying capacitor and a second flying capacitor to form a first connection relation with the power-receiving terminal, the ground terminal, the positive output terminal and the negative output terminal within a first operation time period, and form a second connection relation within a second operation time period. Under the double power voltage power supplying mode, the pump unit circuit is operated in the first operation time period and the second operation time period in an interlaced manner, such that the positive output terminal and the negative output terminal respectively output the positive output voltage and the negative output voltage that each has a voltage value that is two times of that of the power voltage.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present disclosure is to provide a charge pump circuit and a power supplying method having dynamic voltage adjusting mechanism of the same to dynamically adjust an output voltage according to different driving requirements to be able to drive a high impedance load and save power at the same time.

Figure 1:
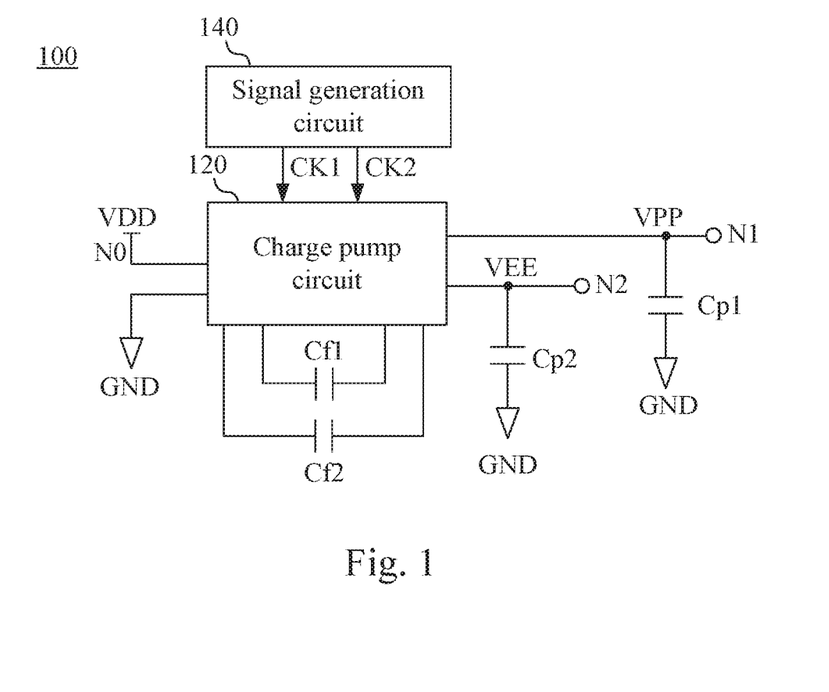
FIG. 1 illustrates a block diagram of a charge pump circuit according to an embodiment of the present disclosure.

Reference is now made to FIG. 1. FIG. 1 illustrates a block diagram of a charge pump circuit 100 according to an embodiment of the present disclosure. The charge pump circuit 100 includes a power-receiving terminal N0, a ground terminal GND, a positive output terminal N1, a negative output terminal N2, a first energy storage capacitor Cp1, a second energy storage capacitor Cp2, a first flying capacitor Cf1, a second flying capacitor Cf2 and a pump unit circuit 120.

In an embodiment, the charge pump circuit 100 is configured to, according to a first clock signal CK1 and a second clock signal CK2, control the pump unit circuit 120 to adjust a connection relation of circuit components and various circuit nodes thereof. The circuit components include the first energy storage capacitor Cp1, the second energy storage capacitor Cp2, the first flying capacitor Cf1, and the second flying capacitor Cf2. The circuit nodes include the power-receiving terminal N0, the ground terminal GND, the positive output terminal N1 and the negative output terminal N2. Accordingly, a power voltage VDD inputted to the charge pump circuit 100 is converted to a positive output voltage VPP and a negative output voltage VEE having different levels under different power supplying modes.

Figure 2:
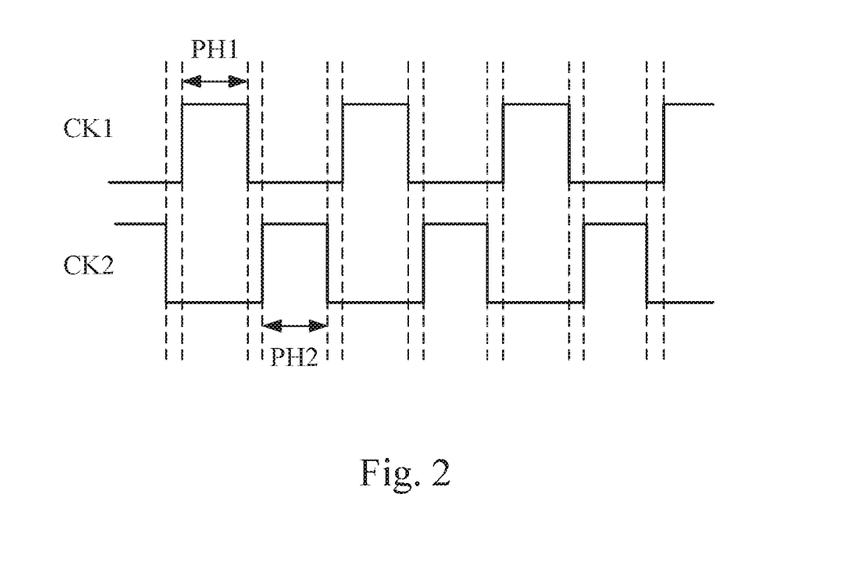
FIG. 2 illustrates a timing diagram of the first clock signal and the second clock signal according to an embodiment of the present disclosure.

Reference is now made to FIG. 2. FIG. 2 illustrates a timing diagram of the first clock signal CK1 and the second clock signal CK2 according to an embodiment of the present disclosure. As illustrated in FIG. 2, an operation phase PH1 of the first clock signal CK1 and an operation phase PH2 of the second clock signal CK2 are not overlapped. The circuit paths in the circuit that are not supposed to be coupled together under different operation phases can be prevented from being coupled together.

In an embodiment, the charge pump circuit 100 has four power supplying modes. Under the four power supplying modes, the charge pump circuit 100 has different power conversion rates. More specifically, under four power supplying modes, the charge pump circuit 100 respectively generates four different amounts of amplified output voltages (i.e. the voltage differences between the positive output voltage VPP and the negative output voltage VEE). For example, the output voltage can be 4 times of the power voltage VDD (±2VDD), 2 times of the power voltage VDD (±VDD), 1 time of the power voltage VDD (±½ VDD), and ⅔ times of the power voltage VDD (±⅓ VDD). Different power supplying modes of the charge pump circuit 100 can be selected according to the power required by a subsequent circuit (the target circuit that the charge pump circuit 100 supplies power to).

In order to give a clear description, the four power supplying modes are named respectively as a double power voltage power supplying mode, a power voltage power supplying mode, a half power voltage power supplying mode and a one-third power voltage power supplying mode.

The configuration of the charge pump circuit 100 is further described in detail.

The power-receiving terminal N0 is electrically coupled to a power source of the system to receive the power voltage VDD therefrom. The ground terminal GND is electrically coupled to a ground level of the system.

The first energy storage capacitor Cp1 is coupled between the positive output terminal N1 and the ground terminal GND. The second energy storage capacitor Cp2 is coupled between the negative output terminal N2 and the ground terminal GND.

The pump unit circuit 120 is coupled to the power-receiving terminal N0, the ground terminal GND, the positive output terminal N1, the negative output terminal N2, the first flying capacitor Cf1 and the second flying capacitor Cf2.

The pump unit circuit 120 operates according to the selected power supplying mode, and uses the first clock signal CK1 and the second clock signal CK2 to control the electrical connection relation among different components and nodes. Accordingly, the inputted power voltage VDD is converted to the positive output voltage VPP and the negative output voltage VEE having the voltage values corresponding to the selected power supplying mode.

More specifically, after the electrical connection relation is determined, the positive output terminal N1 outputs the positive output voltage VPP according to the conversion of the power voltage VDD performed by the charge pump circuit 100. The negative output terminal N2 outputs the negative output voltage VEE according to the conversion of the power voltage VDD performed by the charge pump circuit 100. The positive output voltage VPP and the negative output voltage VEE are used as the power supplied to the subsequently circuit for operation. The first energy storage capacitor Cp1 and the second energy storage capacitor Cp2 can also serve as voltage stabilizing capacitors for the positive output voltage VPP and the negative output voltage VEE.

The first clock signal CK1 and the second clock signal CK2 can be generated by a signal generation circuit 140. Since the configuration and the operation of the signal generation circuit 140 can be understood by those skilled in the art, the detail thereof is not described herein.

Figure 3A:
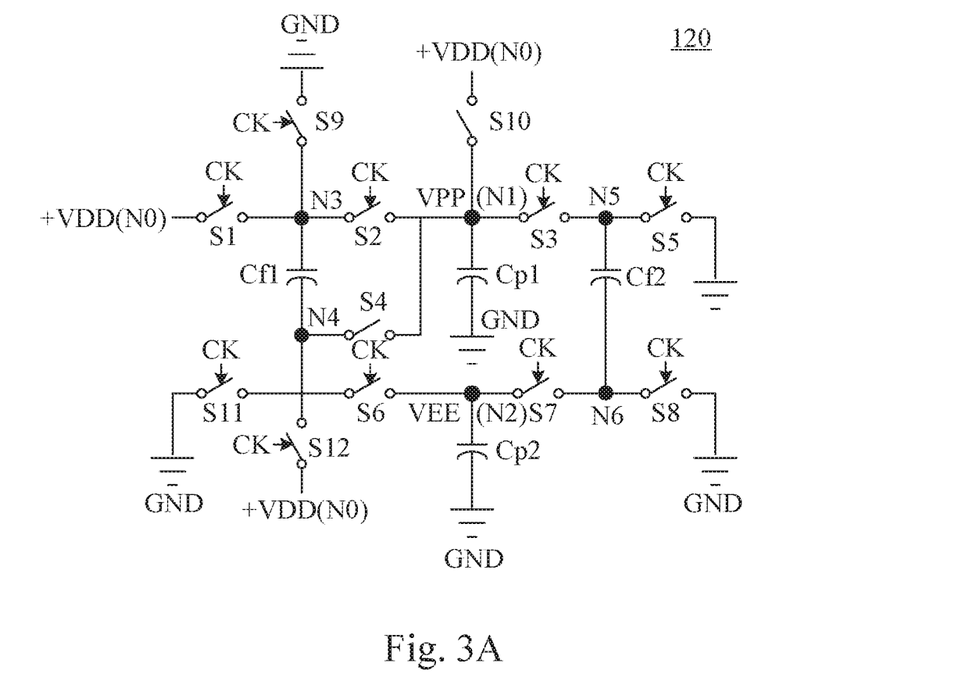
FIG. 3A and FIG. 3B illustrate diagrams of the pump unit circuit according to an embodiment of the present disclosure.
Figure 3B:
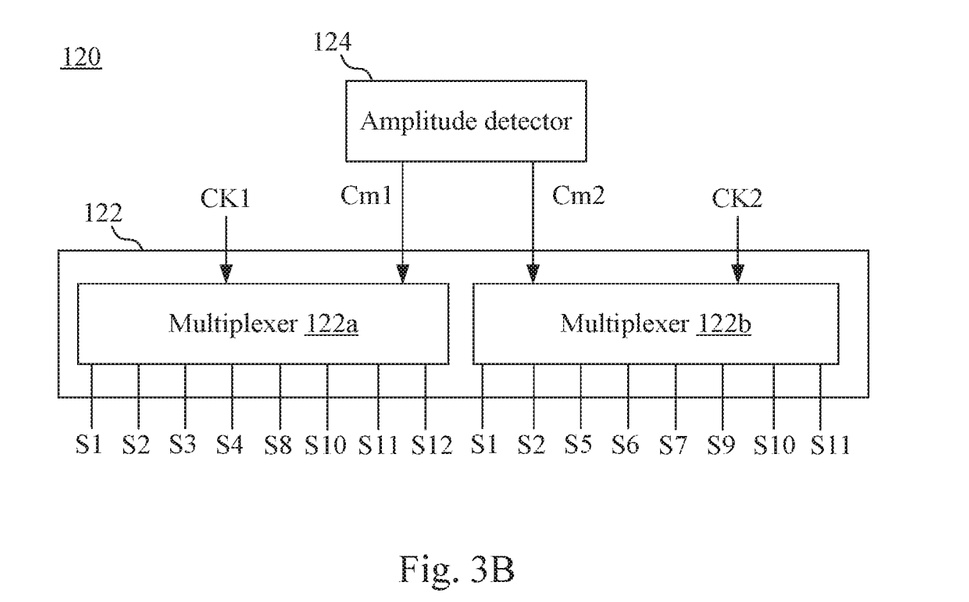

Reference is now made to FIG. 3A and FIG. 3B. FIG. 3A and FIG. 3B illustrate diagrams of the pump unit circuit 120 according to an embodiment of the present disclosure.

As illustrated in FIG. 3A, the pump unit circuit 120 includes a plurality of switches S1-S12. In FIG. 3A, the label CK represents one of the first clock signal CK1 and the second clock signal CK2.

As illustrated in FIG. 3B, the pump unit circuit 120 may further include a multiplexer circuit 122. The multiplexer circuit 122 is coupled to every one of the switches S1-S12. Further, the multiplexer circuit 122 is coupled to the signal generation circuit 140.

When the charge pump circuit 100 is in operation, the multiplexer circuit 122 respectively transmits the first clock signal CK1 and the second clock signal CK2 to the switches according to the power supplying mode that the pump unit circuit 120 operates. In some embodiments, the first clock signal CK1 or the second clock signal CK2 is transmitted to one control terminal of at least one of the switches In some embodiments, the multiplexer circuit 122 may include a multiplexer 122a and a multiplexer 122b.

The input terminal of the multiplexer 122a is coupled to the signal generation circuit 140, and the output terminals are coupled to one or more than one switches (e.g. the switches S1, S2, S3, S4, S8, S10, S11 or S12). The multiplexer 122a further transmits the first clock signal CK1 from the input terminal to at least one output terminal according to the selected power supplying mode.

The input terminal of the multiplexer 122b is coupled to the signal generation circuit 140, and the output terminals are coupled to one or more than one switches (e.g. the switches S1, S2, S5, S6, S7, S9, S10 or S11). The multiplexer 122b further transmits the second clock signal CK2 from the input terminal to at least one output terminal according to the selected power supplying mode.

In some embodiments, the pump unit circuit 120 may further include an amplitude detector 124 coupled to the multiplexer circuit 122 and further electrically coupled to an input terminal or an output terminal of the subsequent circuit. The power terminal of the subsequent circuit is coupled to the positive output terminal N1 and the negative output terminal N2. The positive output voltage VPP and the negative output voltage VEE supply power to the subsequent circuit or drive the input signal of the subsequent circuit.

According to the signal amplitude of an input signal or an output signal of the subsequent circuit within a predetermined time period, the amplitude detector 124 determines the power supplying mode operated by the pump unit circuit 120 (charge pump circuit 100). The amplitude detector 124 further generates corresponding control signals Cm1 and Cm2 to the multiplexer 122a and the multiplexer 122b. The formation of the conducted paths therein can be controlled accordingly to connect the input terminal and the output terminals.

In the example illustrated in FIG. 3A, the switches include the first switch S1 to the twelfth switch S12.

The first switch S1 is electrically coupled between the power-receiving terminal NO and the anode of the first flying capacitor Cf1 (node N3). The second switch S2 is electrically coupled between the positive output terminal N1 and the anode of the first flying capacitor Cf1 (node N3). The third switch S3 is electrically coupled between the positive output terminal N1 and the anode of the second flying capacitor Cf2 (node N5). The fourth switch S4 is electrically coupled between the positive output terminal N1 and the cathode of the first flying capacitor Cf1 (node N4). The fifth switch S5 is electrically coupled between the ground terminal GND and the anode of the second flying capacitor Cf2 (node N5). The sixth switch S6 is electrically coupled between the negative output terminal N2 and the cathode of the first flying capacitor Cf1 (node N4). In other words, the sixth switch S6 is electrically coupled to the negative output terminal N2 and the cathode of the first flying capacitor Cf1 (node N4). The seventh switch S7 is electrically coupled between negative output terminal (node N2) and the cathode of the second flying capacitor Cf2 (node N6). The eighth switch S8 is electrically coupled between the ground terminal GND and the cathode of the second flying capacitor Cf2 (node N6). The ninth switch S9 is electrically coupled between the ground terminal GND and the anode of the first flying capacitor Cf1 (node N3). The tenth switch S10 is electrically coupled between the power-receiving terminal NO and the positive output terminal N1. The eleventh switch S11 is electrically coupled between the ground terminal GND and the cathode of the first flying capacitor Cf1 (node N4). The twelfth switch S12 is electrically coupled between the power-receiving terminal NO and the cathode of the first flying capacitor Cf1 (node N4).

In some embodiments, each of switches, from the first switch S1 to the twelfth switch S12, can be implemented by a power switch.

In some embodiments, the double power voltage power supplying mode, the power voltage power supplying mode, the half power voltage power supplying mode, and the one-third power voltage power supplying mode can respectively be a highest power supplying mode, a high power supplying mode, a medium power supplying mode, and a low power supplying mode.

Under the double power voltage power supplying mode, the amplitude detector 124 controls the multiplexer 122a of the multiplexer circuit 122, to transmit the first clock signal CK1 to the control terminals of the switches S2, S3, S8 and S12. Further, the amplitude detector 124 controls the multiplexer 122b of the multiplexer circuit 122, to transmit the second clock signal CK2 to the control terminals of the switches S1, S5, S7 and S11. The control terminals of the switches S4, S6 and S9-S10 do not receive any control signal, such that the switches S4, S6 and S9-S10 turn off to become open circuits. More specifically, under the double power voltage power supplying mode, the switches S1-S3, S5, S7-S8 and S11-S12 are in operation. The switches S4, S6 and S9-S10 are not in operation.

Figure 4:
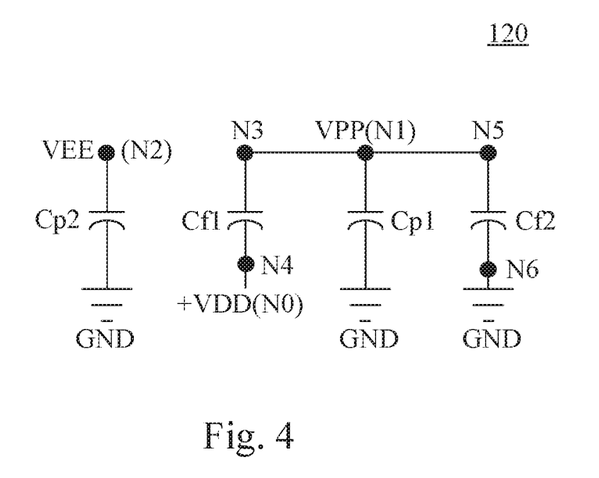
FIG. 4 illustrates a diagram of the first equivalent circuit of the charge pump circuit operated according to the operation phase of the first clock signal within a first operation time period and under the double power voltage power supplying mode, according to an embodiment of the present disclosure.

As a result, the switches S2, S3, S8 and S12 are turned on in response to the operation phase PH1 of the first clock signal CK1 to form a first equivalent circuit. Reference is now made to FIG. 4. FIG. 4 illustrates a diagram of the first equivalent circuit of the charge pump circuit 100 operated according to the operation phase PH1 of the first clock signal CK1 within a first operation time period and under the double power voltage power supplying mode, according to an embodiment of the present disclosure.

Corresponding to the operation phase PH1 of the first clock signal CK1, the first flying capacitor Cf1 is coupled between the power-receiving terminal NO and the positive output terminal N1 in a reverse manner. The second flying capacitor Cf2 and the first energy storage capacitor Cf1 are coupled in parallel between the positive output terminal N1 and the ground terminal GND in a forward manner. In other words, the anode of the first flying capacitor Cf1 (node N3) is coupled to the positive output terminal N1. The cathode of the first flying capacitor Cf1 (node N4) is coupled to the power-receiving terminal NO. The anode of the second flying capacitor Cf2 (node N5) is coupled to the positive output terminal N1. The cathode of the second flying capacitor Cf2 (node N6) is coupled to the ground terminal GND. Under such a condition, the second energy storage capacitor Cp2 is the only internal component that the negative output terminal N2 is directly coupled to.

In the first equivalent circuit under the double power voltage power supplying mode, each of the cross voltage Vcf2 of the second flying capacitor Cf2 and the cross voltage of the first energy storage capacitor Cp1, is equal to the terminal voltage of the positive output terminal N1 (i.e., positive output voltage VPP). Further, the terminal voltage of the positive output terminal N1 (i.e. positive output voltage VPP) is the sum of the cross voltage Vcf1 of the first flying capacitor Cf1 and the power voltage VDD. The second energy storage capacitor Cp2 is floating between the negative output terminal N2 and the ground terminal GND.

Accordingly, equation 1 and equation 2 can be obtained.

$$VPP = Vcf1 + VDD \qquad \text{(equation 1)}$$

$$Vcf2 = VPP \qquad \text{(equation 2)}$$

Figure 5:
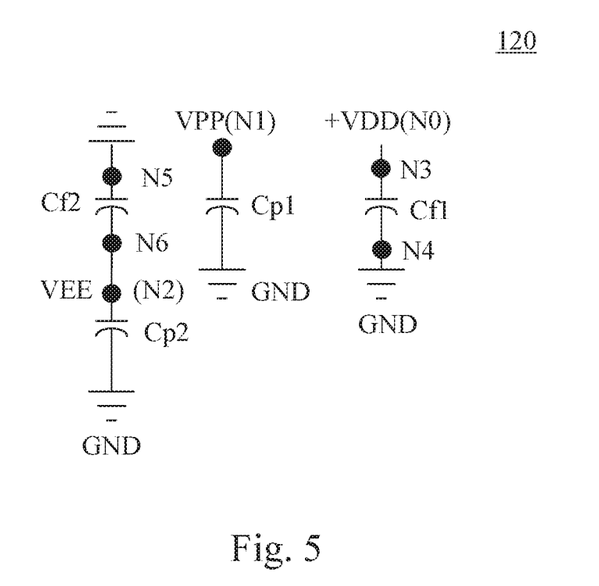
FIG. 5 illustrates a diagram of the second equivalent circuit of the charge pump circuit operated according to the operation phase of the second clock signal within a second operation time period and under the double power voltage power supplying mode, according to an embodiment of the present disclosure.

Further, the switches S1, S5, S7 and S11 are turned on in response to the operation phase PH2 of the second clock signal CK2 to form a second equivalent circuit. Reference is now made to FIG. 5. FIG. 5 illustrates a diagram of the second equivalent circuit of the charge pump circuit 100 operated according to the operation phase PH2 of the second clock signal CK2 within a second operation time period and under the double power voltage power supplying mode, according to an embodiment of the present disclosure.

Corresponding to the operation phase PH2 of the second clock signal CK2, the first flying capacitor Cf1 is coupled between the power-receiving terminal N0 and the ground terminal GND in a forward manner. The second flying capacitor Cf2 is coupled between the negative output terminal N2 and the ground terminal GND in a reverse manner. In other words, the anode of the first flying capacitor Cf1 (node N3) is coupled to the power-receiving terminal N0. The cathode of the first flying capacitor Cf1 (node N4) is coupled to the ground terminal GND. The anode of the second flying capacitor Cf2 (node N5) is coupled to the ground terminal GND. The cathode of the second flying capacitor Cf2 (node N6) is coupled to the negative output terminal N2.

In the second equivalent circuit under the double power voltage power supplying mode, the cross voltage of the second flying capacitor Cf2 is reversely applied to the second energy storage capacitor Cp2 (i.e., the negative output voltage VEE). The cross voltage of the first flying capacitor Cf1 is the power voltage VDD.

As a result, equation 3 and equation 4 can be obtained.

$$V_{cf1}=VDD \quad \text{(equation 3)}$$

$$VEE=-V_{cf2} \quad \text{(equation 4)}$$

According to equation 1 to equation 4, under the double power voltage power supplying mode, the positive output voltage VPP generated at the positive output terminal N1 is 2 times of the power voltage, i.e., 2VDD. The negative output terminal N2 generated at the negative output voltage VEE is −2 times of the power voltage, i.e. −2VDD.

In addition, when the charge pump circuit 100 supplies power under the double power voltage power supplying mode, the pump unit circuit 120 operates in the first operation time period and the second operation time period in an interlaced manner, in response to the first clock signal and the second clock signal. As a result, the power-receiving terminal N0, the ground terminal GND, the positive output terminal N1, the negative output terminal N2, the anode of the first flying capacitor Cf1 (node N3), the cathode of the first flying capacitor Cf1 (node N4), the anode of the second flying capacitor Cf2 (node N5) and the cathode of the second flying capacitor Cf2 (node N6) together form an electrical connection relation, and the electrical connection relation switches between the first equivalent circuit and the second equivalent circuit in an interlaced manner.

Similarly, under the power voltage power supplying mode, the amplitude detector 124 controls the multiplexer 122a of the multiplexer circuit 122, to transmit the first clock signal CK1 to the control terminals of the switches S1, S3, S8, S10 and S11. Further, the amplitude detector 124 controls the multiplexer 122b of the multiplexer circuit 122, to transmit the second clock signal CK2 to the control terminals of the switches S5, S6, S7, S9 and S10. The control terminals of the switches S2, S4 and S12 do not receive any control signal such that the switches S2 and S4 turn off to become open circuits.

Under such a condition, the positive output voltage VPP generated at the positive output terminal N1 is 1 time of power voltage, i.e., VDD. The negative output voltage VEE generated at the negative output terminal N2 is −1 time of power voltage, i.e., −VDD.

Under the half power voltage power supplying mode, the amplitude detector 124 controls the multiplexer 122a of the multiplexer circuit 122, to transmit the first clock signal CK1 to the control terminals of the switches S1, S3, S4 and S8. Further, the amplitude detector 124 controls the multiplexer 122b of the multiplexer circuit 122, to transmit the second clock signal CK2 to the control terminals of the switches S5, S6, S7 and S9. The control terminals of the switches S2, S10, S11 and S12 do not receive any control signal such that the switches S2, S10, S1 land S12 turn off to become open circuits. Under such a condition, the positive output voltage VPP generated at the positive output terminal N1 is ½ times of power voltage, i.e., VDD/2. The negative output voltage VEE generated at the negative output terminal N2 is −½ time of power voltage, i.e., −VDD/2.

Under the one-third power voltage power supplying mode, the amplitude detector 124 controls the multiplexer 122a of the multiplexer circuit 122, to transmit the first clock signal CK1 to the control terminals of the switches S1, S3, S4 and S8. Further, the amplitude detector 124 controls the multiplexer 122b of the multiplexer circuit 122, to transmit the second clock signal CK2 to the control terminals of the switches S2, S5, S6 and S7. The control terminals of the switches S9, S10, S11 and S12 do not receive any control signal such that the switches S9, S10, S11 and S12 turn off to become open circuits. Under such a condition, the positive output voltage VPP generated at the positive output terminal N1 is ⅓ times of power voltage, i.e., VDD/3. The negative output voltage VEE generated at the negative output terminal N2 is −⅓ time of power voltage, i.e., −VDD/3.

Figure 6:
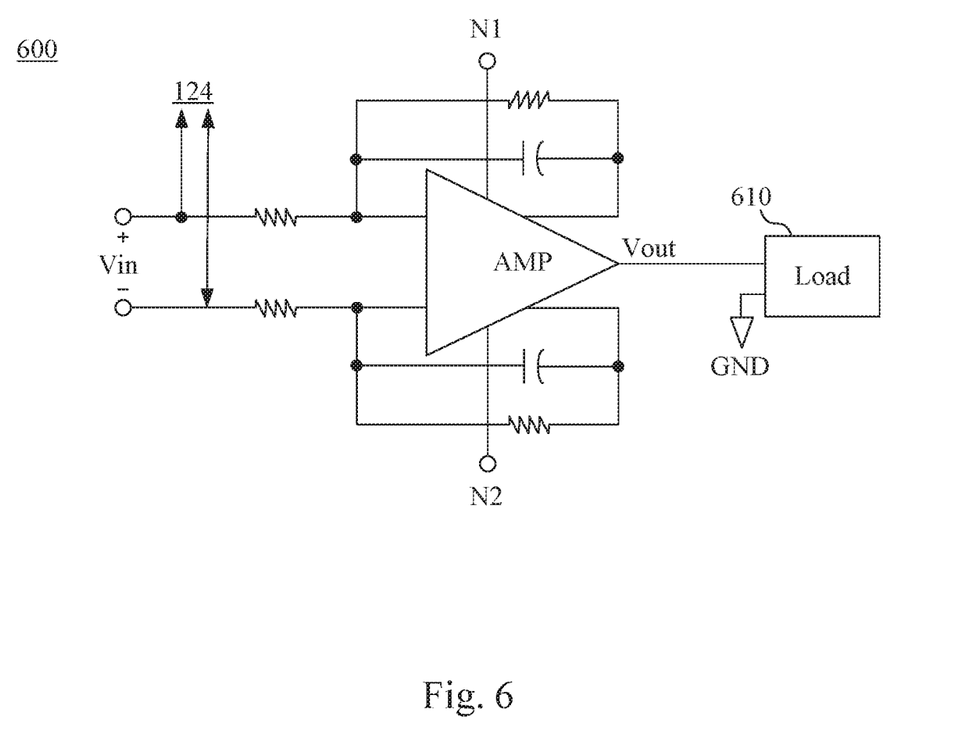
FIG. 6 illustrates a diagram of an amplifier circuit and a load according to an embodiment of the present disclosure.

Reference is now made to FIG. 6. FIG. 6 illustrates a diagram of an amplifier circuit 600 and a load 610 according to an embodiment of the present disclosure.

In an embodiment, the charge pump circuit 100 in FIG. 1 can be used in a driving apparatus that includes the charge pump circuit 100 and the amplifier circuit 600. As a result, the subsequent circuit described above is the amplifier circuit 600. The amplifier circuit 600 mainly includes an amplifier AMP having multiple input terminals, an output terminal and two power terminals. The output terminals are coupled to the load 610. Take the headphone driving apparatus as an example, the load 610 can be the headphone.

The positive output terminal N1 and the negative output terminal N2 of the charge pump circuit 100 are respectively coupled to the two power terminals of the amplifier AMP. The positive output voltage VPP and the negative output voltage VEE generated at the positive output terminal N1 and the negative output terminal N2 are applied to the two power terminals of the amplifier AMP, serving as the power for the operation of the amplifier AMP.

By using the power supplied by the charge pump circuit 100, the amplifier circuit 600 operates to transmit the received input signal Vin through two resistors to the input terminal of the amplifier AMP. The amplifier AMP processes the received signal to generate an output signal Vout and transmits the output signal Vout to the load 610 through the output terminal. The amplitude detector 124 of the charge pump circuit 100 can be electrically coupled to the input terminal and/or the output terminals of the amplifier AMP to detect the input signal Vin and/or the output signal Vout of the amplifier AMP. Take the input signal Vin as an example, the amplitude detector 124 is electrically coupled to the input terminal of the amplifier AMP to detect the amplitude of the input signal Vin.

Within a predetermined time period, when the amplitude detector 124 detects that the amplitude of the input signal Vin is smaller than or equal to a first threshold value, the amplitude detector 124 controls the pump unit circuit 120 to be operated under the one-third power voltage power supplying mode. The positive output voltage VPP and the negative output voltage VEE that respective are +⅓ times and -⅓ times of the power voltage VDD are applied to the power terminals of the amplifier AMP.

When the amplitude detector 124 detects that the amplitude of the input signal Vin is larger than the first threshold value and is smaller than or equal to a second threshold, the amplitude detector 124 controls the pump unit circuit 120 to be operated under the half power voltage power supplying mode. The positive output voltage VPP and the negative output voltage VEE that respective are +½ times and -½ times of the power voltage VDD are applied to the power terminals of the amplifier AMP.

When the amplitude detector 124 detects that the amplitude of the input signal Vin is larger than the second threshold value and is smaller than or equal to a third threshold, the amplitude detector 124 controls the pump unit circuit 120 to be operated under the power voltage power supplying mode. The positive output voltage VPP and the negative output voltage VEE that respective are +1 time and -1 time of the power voltage VDD are applied to the power terminals of the amplifier AMP.

When the amplitude detector 124 detects that the amplitude of the input signal Vin is larger than the third threshold, the amplitude detector 124 controls the pump unit circuit 120 to be operated under the double power voltage power supplying mode. The positive output voltage VPP and the negative output voltage VEE that respective are +2 time and -2 time of the power voltage VDD are applied to the power terminals of the amplifier AMP.

Accordingly, the amount of the positive output voltage VPP and the negative output voltage VEE can be dynamically adjusted according to the amount of the input signal Vin.

It is appreciated that though the configuration having two clock signals (the first clock signal and the second clock signal having non-overlapped operation phase), two flying capacitors (the first flying capacitor and the second flying capacitor), two energy storage capacitors (the first energy storage capacitor and the second energy storage capacitor), and a plurality of switches are used as an example, the configuration of the charge pump circuit is not limited thereto.

Figure 7:
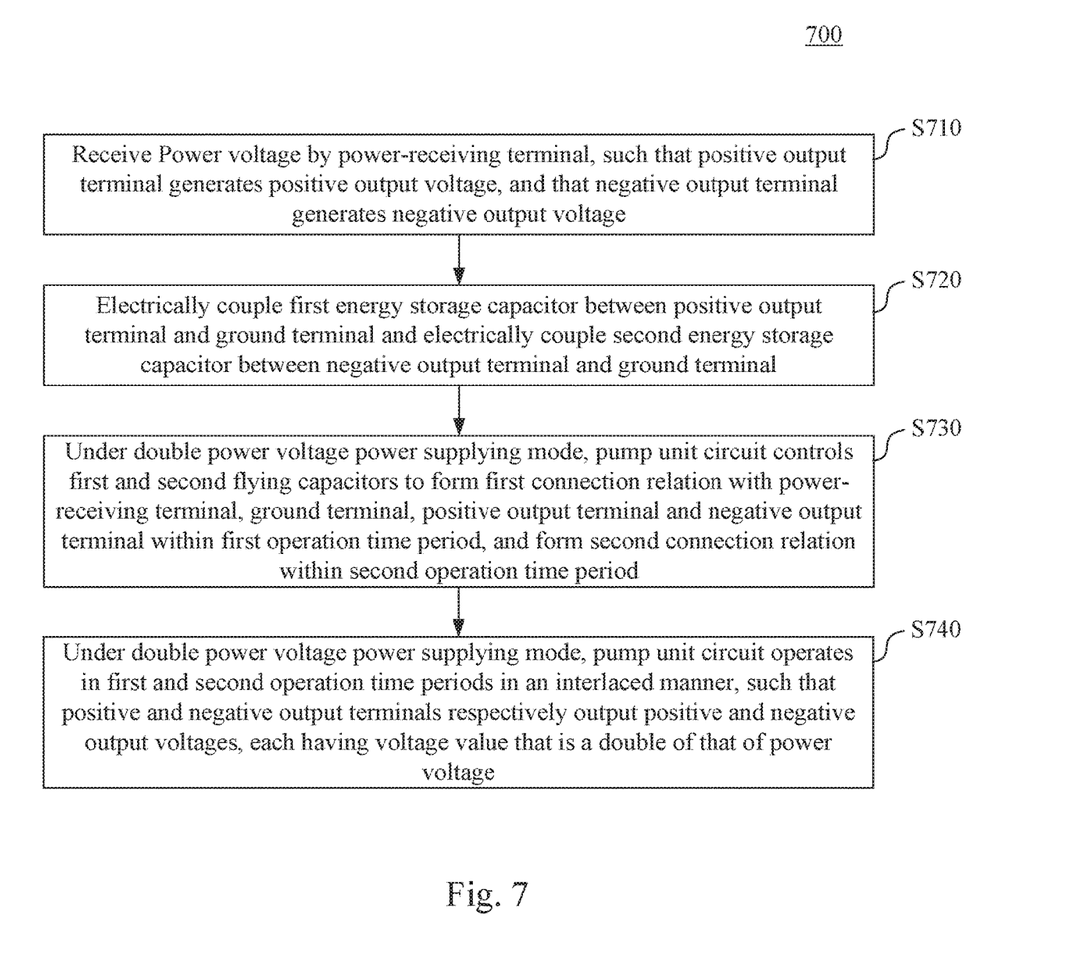
FIG. 7 illustrates a flow chart of a power supplying method according to an embodiment of the present disclosure.

Reference is now made to FIG. 7. FIG. 7 illustrates a flow chart of a power supplying method 700 according to an embodiment of the present disclosure.

In addition to the device described above, the present disclosure further provides a power supplying method 700 that can be used in such as, but not limited to the charge pump circuit 100 100 in FIG. 1. As illustrated in FIG. 7, an embodiment of the power supplying method 700 includes the following steps.

In step S710, the power voltage VDD is received by the power-receiving terminal NO, such that the positive output terminal N1 generates the positive output voltage VPP, and that the negative output terminal N2 generates the negative output voltage VEE.

In step S720, the first energy storage capacitor Cp1 is electrically coupled between the positive output terminal N1 and the ground terminal GND. The second energy storage capacitor Cp2 is electrically coupled between the negative output terminal N2 and the ground terminal GND.

In step S730, under the double power voltage power supplying mode, the pump unit circuit 120 controls the first flying capacitor Cf1 and the second flying capacitor Cf2 to form the first connection relation with the power-receiving terminal NO, the ground terminal GND, the positive output terminal N1 and the negative output terminal N2 within the first operation time period, and form the second connection relation within the second operation time period.

More specifically, under the double power voltage power supplying mode and within the first operation time period, the pump unit circuit 120 controls the first flying cathode of the first flying capacitor Cf1 to be electrically coupled to the power-receiving terminal NO. Also, the pump unit circuit 120 controls the second flying cathode of the second flying capacitor Cf2 to be electrically coupled to the ground terminal GND. The pump unit circuit 120 further controls the first flying anode of the first flying capacitor Cf1 and the second flying anode of the second flying capacitor Cf2 to be electrically coupled to the positive output terminal N1.

Moreover, under the double power voltage power supplying mode and within the second operation time period, the pump unit circuit 120 controls the first flying cathode of the first flying capacitor Cf1 and the second flying anode of the second flying capacitor Cf2 to be electrically coupled to ground terminal GND. Also, the pump unit circuit 120 controls the first flying anode of the first flying capacitor Cf1 to be electrically coupled to positive output terminal N1. The pump unit circuit 120 further controls the second flying cathode of the second flying capacitor Cf2 to be electrically coupled to negative output terminal N2.

In step S740, under the double power voltage power supplying mode, the pump unit circuit 120 operates in the first operation time period and the second operation time period in an interlaced manner, such that the positive output terminal N1 and the negative output terminal N2 respectively output the positive output voltage VPP and the negative output voltage VEE, each having a voltage value that is a double of that of the power voltage VDD.

It is appreciated that the embodiments described above are merely an example. In other embodiments, it should be appreciated that many modifications and changes may be made by those of ordinary skill in the art without departing from the spirit of the disclosure.

In summary, the charge pump circuit and power supplying method of the present disclosure can dynamically adjust the output voltage according to different output driving requirements to be able to drive a high impedance load and save power at the same time.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:
1. A charge pump circuit, comprising:
   a power-receiving terminal, configured to receive a power voltage;
   a ground terminal;
   a positive output terminal, configured to output a positive output voltage;
   a negative output terminal, configured to output a negative output voltage;
   a first energy storage capacitor, electrically coupled between the positive output terminal and the ground terminal;
   a second energy storage capacitor, electrically coupled between the negative output terminal the ground terminal;

a first flying capacitor and a second flying capacitor; and
a pump unit circuit, configured to, under a double power voltage power supplying mode, control the first flying capacitor and the second flying capacitor to form a first connection relation with the power-receiving terminal, the ground terminal, the positive output terminal and the negative output terminal within a first operation time period, and form a second connection relation within a second operation time period;
wherein under the double power voltage power supplying mode, the pump unit circuit operates in the first operation time period and the second operation time period in an interlaced manner, such that the positive output terminal and the negative output terminal respectively output the positive output voltage and the negative output voltage, each having a voltage value that is a double of that of the power voltage.

2. The charge pump circuit of claim 1, wherein in the first operation time period, the pump unit circuit controls a first flying cathode of the first flying capacitor to be electrically coupled to the power-receiving terminal, controls a second flying cathode of the second flying capacitor to be electrically coupled to the ground terminal, and controls a first flying anode of the first flying capacitor and a second flying anode of the second flying capacitor to be electrically coupled to the positive output terminal; and
in the second operation time period, the pump unit circuit controls the first flying cathode of the first flying capacitor and the second flying anode of the second flying capacitor to be electrically coupled to the ground terminal, controls the first flying anode of the first flying capacitor to be electrically coupled to the power-receiving terminal, and controls the second flying cathode of the second flying capacitor to be electrically coupled to the negative output terminal.

3. The charge pump circuit of claim 1, wherein the pump unit circuit controls a plurality of switches according to a first clock signal and a second clock signal having non-overlapped operation phases in the first operation time period and the second operation time period, and the switches comprise:
a first switch, coupled between the power-receiving terminal and the first flying anode of the first flying capacitor;
a second switch, coupled between the positive output terminal and the first flying anode of the first flying capacitor;
a third switch, coupled between the positive output terminal and the second flying anode of the second flying capacitor;
a fourth switch, coupled between the ground terminal and the second flying anode of the second flying capacitor;
a fifth switch, coupled between the negative output terminal and the second flying cathode of the second flying capacitor;
a sixth switch, coupled between the ground terminal and the second flying cathode of the second flying capacitor;
a seventh switch, coupled between the ground terminal and the first flying cathode of the first flying capacitor; and
a eighth switch, coupled between the power-receiving terminal and the first flying cathode of the first flying capacitor.

4. The charge pump circuit of claim 3, wherein under the double power voltage power supplying mode, the second switch, the third switch, the sixth switch and the eighth switch turn on in response to the operation phase of the first clock signal, and the first switch, the fourth switch, the fifth switch and the seventh switch turn on in response to the operation phase of the second clock signal.

5. The charge pump circuit of claim 1, wherein the pump unit circuit controls a plurality of switches according to a first clock signal and a second clock signal having non-overlapped operation phases in the first operation time period and the second operation time period, and the switches comprise:
a first switch, coupled between the power-receiving terminal and the first flying anode of the first flying capacitor;
a second switch, coupled between the positive output terminal and the first flying anode of the first flying capacitor;
a third switch, coupled between the positive output terminal and the second flying anode of the second flying capacitor;
a fourth switch, coupled between the positive output terminal and the first flying cathode of the first flying capacitor;
a fifth switch, coupled between the ground terminal and the second flying anode of the second flying capacitor;
a sixth switch, coupled between the negative output terminal and the first flying cathode of the first flying capacitor;
a seventh switch, coupled between the negative output terminal and the second flying cathode of the second flying capacitor;
a eighth switch, coupled between the ground terminal and the second flying cathode of the second flying capacitor;
a ninth switch, coupled between the ground terminal and the first flying anode of the first flying capacitor;
a tenth switch, coupled between the power-receiving terminal and the positive output terminal;
an eleventh switch, coupled between the ground terminal and the first flying cathode of the first flying capacitor; and
a twelfth switch, coupled between the power-receiving terminal and the first flying cathode of the first flying capacitor.

6. The charge pump circuit of claim 5, wherein under the double power voltage power supplying mode, the second switch, the third switch, the eighth switch and the twelfth switch turn on in response to the operation phase of the first clock signal, and the first switch, the fifth switch, the seventh switch and the eleventh switch turn on in response to the operation phase of the second clock signal.

7. The charge pump circuit of claim 5, wherein under a power voltage power supplying mode, the first switch, the third switch, the eighth switch, the tenth switch and the eleventh switch turn on in response to the operation phase of the first clock signal, and the fifth switch, the sixth switch, the seventh switch, the ninth switch and the tenth switch turn on in response to the operation phase of the second clock signal;
under a half power voltage power supplying mode, the first switch, the third switch, the fourth switch and the eighth switch turn on in response to the operation phase of the first clock signal, and the fifth switch, the sixth switch, the seventh switch and the ninth switch turn on in response to the operation phase of the second clock signal; and
under a one-third power voltage power supplying mode, the first switch, the third switch, the fourth switch and the eighth switch turn on in response to the operation phase of the first clock signal, and the second switch, the fifth switch, the sixth switch and the seventh switch turn on in response to the operation phase of the second clock signal.

8. The charge pump circuit of claim 1, further comprising:
an amplitude detector, configured to detect an amplitude of either an input signal or an output signal of a subsequent circuit having a power supplied by the positive output voltage and the negative output voltage, and select a power supplying mode of the pump unit circuit accordingly;
wherein when the amplitude is smaller than or equal to a first threshold value, the amplitude detector selects a one-third power voltage power supplying mode;
when the amplitude is larger than the first threshold value and is smaller than or equal to a second threshold value, the amplitude detector selects a half power voltage power supplying mode;
when the amplitude is larger than the second threshold value and is smaller than or equal to a third threshold value, the amplitude detector selects a power voltage power supplying mode; and
when the amplitude is larger than the third threshold value, the amplitude detector selects the double power voltage power supplying mode.

9. A power supplying method having a dynamic voltage adjusting mechanism used in a charge pump circuit, comprising:
receiving a power voltage by a power-receiving terminal, such that a positive output terminal outputs a positive output voltage, and that a negative output terminal outputs a negative output voltage;
electrically coupling a first energy storage capacitor between the positive output terminal and a ground terminal, and electrically coupling a second energy storage capacitor between the negative output terminal the ground terminal;
under a double power voltage power supplying mode, using a pump unit circuit to control a first flying capacitor and a second flying capacitor to form a first connection relation with the power-receiving terminal, the ground terminal, the positive output terminal and the negative output terminal within a first operation time period, and to form a second connection relation within a second operation time period; and
under the double power voltage power supplying mode, operating the pump unit circuit in the first operation time period and the second operation time period in an interlaced manner, such that the positive output terminal and the negative output terminal respectively output the positive output voltage and the negative output voltage, each having a voltage value that is a double of that of the power voltage.

10. The power supplying method of claim 9, further comprising:
in the first operation time period, using the pump unit circuit to control a first flying cathode of the first flying capacitor to be electrically coupled to the power-receiving terminal, control a second flying cathode of the second flying capacitor to be electrically coupled to the ground terminal, and control a first flying anode of the first flying capacitor and a second flying anode of the second flying capacitor to be electrically coupled to the positive output terminal; and
in the second operation time period, using the pump unit circuit to control the first flying cathode of the first flying capacitor and the second flying anode of the second flying capacitor to be electrically coupled to the ground terminal, control the first flying anode of the first flying capacitor to be electrically coupled to the power-receiving terminal, and control the second flying cathode of the second flying capacitor to be electrically coupled to the negative output terminal.

11. The power supplying method of claim 9, wherein the pump unit circuit controls a plurality of switches according to a first clock signal and a second clock signal having non-overlapped operation phases in the first operation time period and the second operation time period, and the switches comprise:
a first switch, coupled between the power-receiving terminal and the first flying anode of the first flying capacitor;
a second switch, coupled between the positive output terminal and the first flying anode of the first flying capacitor;
a third switch, coupled between the positive output terminal and the second flying anode of the second flying capacitor;
a fourth switch, coupled between the ground terminal and the second flying anode of the second flying capacitor;
a fifth switch, coupled between the negative output terminal and the second flying cathode of the second flying capacitor;
a sixth switch, coupled between the ground terminal and the second flying cathode of the second flying capacitor;
a seventh switch, coupled between the ground terminal and the first flying cathode of the first flying capacitor; and
a eighth switch, coupled between the power-receiving terminal and the first flying cathode of the first flying capacitor.

12. The power supplying method of claim 11, wherein under the double power voltage power supplying mode, the power supplying method further comprises:
turning on the second switch, the third switch, the sixth switch and the eighth switch in response to the operation phase of the first clock signal; and
turning on the first switch, the fourth switch, the fifth switch and the seventh switch in response to the operation phase of the second clock signal.

13. The power supplying method of claim 9, wherein the pump unit circuit controls a plurality of switches according to a first clock signal and a second clock signal having non-overlapped operation phases in the first operation time period and the second operation time period, and the switches comprise:
a first switch, coupled between the power-receiving terminal and the first flying anode of the first flying capacitor;
a second switch, coupled between the positive output terminal and the first flying anode of the first flying capacitor;
a third switch, coupled between the positive output terminal and the second flying anode of the second flying capacitor;
a fourth switch, coupled between the positive output terminal and the first flying cathode of the first flying capacitor;
a fifth switch, coupled between the ground terminal and the second flying anode of the second flying capacitor;

a sixth switch, coupled between the negative output terminal and the first flying cathode of the first flying capacitor;
a seventh switch, coupled between the negative output terminal and the second flying cathode of the second flying capacitor;
a eighth switch, coupled between the ground terminal and the second flying cathode of the second flying capacitor;
a ninth switch, coupled between the ground terminal and the first flying anode of the first flying capacitor;
a tenth switch, coupled between the power-receiving terminal and the positive output terminal;
an eleventh switch, coupled between the ground terminal and the first flying cathode of the first flying capacitor; and
a twelfth switch, coupled between the power-receiving terminal and the first flying cathode of the first flying capacitor.

14. The power supplying method of claim 13, wherein under the double power voltage power supplying mode, the power supplying method further comprises:
turning on the second switch, the third switch, the eighth switch and the twelfth switch in response to the operation phase of the first clock signal; and
turning on the first switch, the fifth switch, the seventh switch and the eleventh switch in response to the operation phase of the second clock signal.

15. The charge pump circuit of claim 13, further comprising:
under a power voltage power supplying mode, turning on the first switch, the third switch, the eighth switch, the tenth switch and the eleventh switch in response to the operation phase of the first clock signal, and turning on the fifth switch, the sixth switch, the seventh switch, the ninth switch and the tenth switch in response to the operation phase of the second clock signal;
under a half power voltage power supplying mode, turning on the first switch, the third switch, the fourth switch and the eighth switch in response to the operation phase of the first clock signal, and turning on the fifth switch, the sixth switch, the seventh switch and the ninth switch in response to the operation phase of the second clock signal; and
under a one-third power voltage power supplying mode, turning on the first switch, the third switch, the fourth switch and the eighth switch in response to the operation phase of the first clock signal, and turning on the second switch, the fifth switch, the sixth switch and the seventh switch in response to the operation phase of the second clock signal.

16. The charge pump circuit of claim 9, further comprising:
by an amplitude detector, detecting an amplitude of either an input signal or an output signal of a subsequent circuit having a power supplied by the positive output voltage and the negative output voltage, and selecting a power supplying mode of the pump unit circuit accordingly;
when the amplitude is smaller than a first threshold value, selecting a one-third power voltage power supplying mode;
when the amplitude is larger than the first threshold value and is smaller than a second threshold value, selecting a half power voltage power supplying mode;
when the amplitude is larger than the second threshold value and is smaller than a third threshold value, selecting a power voltage power supplying mode; and
when the amplitude is larger than the third threshold value, selecting the double power voltage power supplying mode.

* * * * *